United States Patent Office

2,792,395
Patented May 14, 1957

2,792,395

PREPARATION OF GUANAMINES

Ronald David Thrower and Frank James Pinchin, London, England, assignors to The British Oxygen Company Limited, London, England, a British company No Drawing. Application July 8, 1955,
Serial No. 520,904

Claims priority, application Great Britain August 22, 1955

8 Claims. (Cl. 260—249.9)

The present invention relates to the preparation of guanamines (2:4-diamino-1:3:5-triazines) from dicyandiamide and is an improvement in or modification of the invention which is the subject of Patent No. 2,735,850.

It is known that guanamines may be prepared by reacting nitriles with dicyandiamide, that the reaction is catalysed by organic bases such as piperidine, pyrrolidine, di-(2-aminoethyl) amine and the like, and that an excess of nitrile may be used to serve as a reaction medium and to keep the dicyandiamide in solution.

It has further been proposed to react dicyandiamide with an organic nitrile in the presence of a strongly basic alkalimetal compound, the reactants being mixed with a hydroxylated solvent. Whilst in this reaction high yields are obtainable, and a wide range of nitriles can be used, there are certain drawbacks in the operation of the process. In particular, the reactants are never completely dissolved, and the reaction mixture thickens during the course of reaction from a thin slurry to a thick porridge which is difficult to stir, and it is also therefore difficult to control the temperature on a large scale of operation, since the reaction is highly exothermic. Further, the crude reaction product has to be heavily diluted with water for the recovery of the guanamine, and for economic operation the hydroxylated solvent has to be recovered from this dilute solution.

It has further been proposed to convert dicyandiamide to a guanamine by reaction with an ammonium salt of an organic carboxylic acid in the presence of ammonium carbonate. This reaction is carried out at temperatures in the neighbourhood of the melting point of dicyandiamide, but the reacting mass is solid throughout the operation, and handling difficulties arise in consequence.

In Patent No. 2,735,850, a process is described for the manufacture of guanamines comprising reacting dicyandiamide with a nitrile or polynitrile in liquid ammonia in the presence of a catalyst consisting of an alkali metal or an alkaline earth metal or an alkali metal hydroxide or amide or other strongly basic alkali metal compound at a temperature between 0° C. and 120° C., and preferably between 60° C. and 100° C. Such a process gives a high yield of product, and is free from the disadvantages of the processes previously employed. The preferred range of reaction temperature is substantially below that of other processes, and the liquid ammonia serves as a heat buffer to assist in controlling the heat liberated by the reaction. Further, the solvent can be readily distilled off during or at the end of the reaction before the solid guanamine is treated with water for purification purposes.

In this process the operating pressure is determined by the temperature. At the beginning of the reaction the pressure is that of a solution of dicyandiamide in liquid ammonia, but at the end of the reaction the pressure is virtually the equilibrium vapour pressure of ammonia at a given temperature. At 60° C. the final pressure would be 24.8 atmg., and at 100° C. it would be 60.8 atmg.

It is an object of the present invention to provide a process which will retain the advantages gained by operating in liquid ammonia as described in Patent No. 2,735,850 whilst being capable of operation at lower pressures.

According to the present invention, the process for the preparation of a guanamine described in Patent No. 2,735,850 is modified by using as reaction medium a mixture of ammonia and a hydroxylated solvent containing at least 10% by weight of ammonia, the reaction being effected at a temperature between 20° C. and 120° C.

The hydroxylated solvent used is preferably a low boiling compound, and methanol is particularly useful in this respect. Although satisfactory reactions can be obtained with the above minimum amount of ammonia, it is preferred to use between 30% and 50% of ammonia in the mixed solvent, in which range the yields obtained are substantially the same as those obtained in liquid ammonia. The preferred temperature of operation is between 60° C. and 100° C. Examples of suitable catalysts include, sodium, potassium, calcium, sodium and potassium hydroxides, sodium and potassium, carbonates, sodamide, sodium methoxide, and sodium dicyandiamide, but the invention is not limited to the use of these particular compounds.

The preferred range of reaction temperature is substantially below that of other processes except that of Patent No. 2,735,850. The mixed solvent serves as a heat buffer to assist in controlling the heat liberated by the reaction, which in the case of benzonitrile amounts to 34.9 kcal. per mole. To take up this heat it is possible, if desired, to use an appreciable amount of solvent, for example up to twice the weight of dicyandiamide used, and much of the heat of reaction is taken up in raising the temperature of the solvent. Alternatively it is possible to use less solvent, say a weight equal to that of the dicyandiamide, used, or substantially less; the heat of reaction evaporated some of the solvent, and the vapour can be condensed and returned to the reacting mixture.

At the end of the reaction the solvent can be distilled out of the reaction vessel without separation into its constituents and condensed for re-use.

The amount of catalyst required to bring about the reaction is limited, but for high conversions in comparatively short reaction times it is preferred to use between 5 and 10% of the amount of sodium which is equivalent to the dicyandiamide taken, or between 8 and 17% of the amount of sodium hydroxide which is equivalent to the dicyandiamide taken. The preferred amount of other alkaline catalysts depends to some extent on their solubility in the particular solvent uses, on the chemical nature of the nitrile, on the relative amounts of ammonia and hydroxylated solvent, and on the temperature and other conditions of reaction.

Preferably, the molecular ratio of dicyandiamide to nitrile lies within the range 1.05–1.25, in order to achieve substantially complete conversion of nitrile to guanamine with very high yields.

The pressure of operation will depend to some extent on the hydroxylated solvent, but more particularly on the proportion of ammonia in the mixed solvent. The reduction of operating pressure as compared to operation in liquid ammonia alone, other conditions being equal, can be substantial. Thus, operating at 90° C., the maximum pressure can approach 50 atmg. with liquid ammonia as solvent, but is about 35 atmg. with 50% mixtures of ammonia in methanol, about 20 atmg. for 30% ammonia in methanol and 10 atmg. for 10% ammonia in methanol.

Although the reaction can be carried out in a mild steel vessel, the solution of dicyandiamide in liquid ammonia or in the ammoniacal solvents referred to herein is appreciably corrosive to mild steel, and it is preferred to carry out the operation in an austenitic stainless steel vessel, which resists the corrosive action of dicyandiamide in these solvents, and given products notably free from metallic contamination. In view of this, operating at lower pressures can effect substantial economies in the equipment necessary.

The invention is illustrated by the following examples, in which all parts are parts by weight.

*Example 1*

In a stainless steel autoclave fitted with a stirrer were placed benzonitrile (206 parts), dicyandiamide (196 parts), sodium hydroxide (13.9 parts) and methanol (137 parts). The vessel was charged with liquid ammonia (59 parts), giving a pressure of 9 atmg. at 20° C. The vessel was heated to 90° C. and maintained at 85–90° C. for one hour. The maximum pressure reached during this time was 18 atmg. The mixed solvent was distilled off, and the solid residue was stirred with water (2200 parts); acetic acid was added to give a solution of pH 7, the product was filtered and given a further wash with water (2200 parts). On filtering and drying, 358 parts of pure benzoguanamine were obtained as a white powder, M. P. 226° C.; the yield was 96% on the benzonitrile. Analysis gave C 57.9%, H 4.9%, N 37.5%; calculated for $C_9H_9N_5$: C 57.8%, H 4.8%, N 37.4%.

*Example 2*

In the autoclave of Example 1 were placed benzonitrile (103 parts), dicyandiamide (98 parts), sodium hydroxide (7 parts) and methanol (49.5 parts). The vessel was charged with liquid ammonia (48.5 parts) heated to 90° and maintained at 90–95° C. for one hour. The maximum pressure reached was 33 atmg. The product was worked up as in Example 1, to give 179 parts of benzoguanamine (yield 96%).

*Example 3*

In the autoclave of Example 1 were placed benzonitrile (206 parts), dicyandiamide (196 parts), sodium hydroxide (13.9 parts) and methanol (176.4 parts). The vessel was charged with liquid ammonia (19.6 parts) and heated to 90° C., being maintained at 90–100° C. for one hour; the maximum pressure reached was 9 atmg. The product was worked up as in Example 1, the give 326 parts of benzoguanamine (yield 87%).

*Example 4*

The procedure of Example 1 was followed except that in place of 137 parts of methanol 137 parts of absolute ethanol were used. The pressure after charging with ammonia was 11 atmg. at 20° C., and the maximum pressure reached at 90° C. was 21 atmg. The product was worked up in the same way and the yield of purified benzoguanamine was 94% on the benzonitrile.

*Example 5*

In the stainless steel vessel of Example 1 were placed phenyl acetonitrile (158 parts), dicyandiamide (130 parts), flake caustic soda (10.7 parts), and methanol (64 parts). The vessel was charged with liquid ammonia (50 parts) and then heated to 90° C., and maintained there for one hour, the pressure rising to 28 atmg. The product was triturated with water (700 parts) and acetic acid (16 parts) added. On filtration and drying there was obtained 265 parts of phenylacetoguanamine M. P. 244° C. (yield on phenylacetonitrile 97%).

*Example 6*

In a stainless steel autoclave of Example 1 were placed adipodinitrile (109 parts), dicyandiamide (196 parts) and sodium hydroxide (14 parts) and methanol (137 parts). The vessel was charged with liquid ammonia (59 parts), heated to 90° C. and maintained there for one hour. After distilling off the solvents the product was washed with water and acetic acid giving 180 parts of 4-cyanovaleroguanamine (yield on adipodinitrile 93%).

We claim:

1. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, in the presence of a catalyst chosen from the group consisting of alkali metals, alkaline earth metals, alkali metal hydroxides and amides and other strongly basic alkali metal compounds, at a temperature between 20° C. and 120° C.

2. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, in the the presence of a catalyst chosen from the group consisting of alkali metals, alkaline earth metals, alkali metal hydroxides and amides and other strongly basic alkali metal compounds, at a temperature between 60° C. and 100° C.

3. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, in the presence of sodium hydroxide in an amount of between 4% and 8% of the weight of dicyandiamide, at a temperature between 20° C. and 120° C.

4. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, in the presence of sodium hydroxide in an amount of between 4% and 8% of the weight of dicyandiamide, at a temperature between 60° C. and 100° C.

5. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, the molecular ratio of dicyandiamide to said substance being between 1.05:1 and 1.25:1, in the presence of a catalyst chosen from the group consisting of alkali metals, alkaline earth metals, alkali metal hydroxides and amides and other strongly basic alkali metal compounds, at a temperature between 20° C. and 120° C.

6. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, the molecular ratio of dicyandiamide to said substance being between 1.05:1 and 1.25:1, in the presence of a catalyst chosen from the group consisting of alkali metals, alkaline earth metals, alkali metal hydroxides and amides and other strongly basic alkali metal compounds, at a temperature between 60° C. and 100° C.

7. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, the molecular ratio of dicyandiamide to said substance being between 1.05:1 and 1.25:1, in the presence of sodium hydroxide in an amount of between 4% and 8% of the weight of dicyandiamide, at a temperature between 20° C. and 120° C.

8. Process for the preparation of a guanamine comprising reacting dicyandiamide with a substance chosen from the group consisting of aliphatic and aromatic nitriles and dinitriles in a reaction medium consisting of a mixture of liquid ammonia and a hydroxylated organic solvent containing at least 10% by weight of ammonia, the molecular ratio of dicyandiamide to said substance being between 1.05:1 and 1.25:1, in the presence of sodium hydroxide in an amount of between 4% and 8% of the weight of dicyandiamide, at a temperature between 60° C. and 100° C.

References Cited in the file of this patent
UNITED STATES PATENTS

| | | |
|---|---|---|
| 2,191,361 | Widmer | Feb. 20, 1940 |
| 2,684,366 | Simons | July 20, 1954 |
| 2,735,850 | Jones | Feb. 21, 1956 |

FOREIGN PATENTS

| | | |
|---|---|---|
| 642,409 | Great Britain | 1950 |